United States Patent [19]

Rostoker

[11] Patent Number: 5,300,130
[45] Date of Patent: Apr. 5, 1994

[54] POLISHING MATERIAL

[75] Inventor: David Rostoker, Sturbridge, Mass.

[73] Assignee: Saint Gobain/Norton Industrial Ceramics Corp., Worcester, Mass.

[21] Appl. No.: 96,804

[22] Filed: Jul. 26, 1993

[51] Int. Cl.⁵ ................................................ C09C 1/68
[52] U.S. Cl. .......................................... 51/309; 106/6
[58] Field of Search .............................. 51/309; 106/6

[56] References Cited

U.S. PATENT DOCUMENTS

| | | | |
|---|---|---|---|
| 4,657,754 | 4/1987 | Bauer et al. | 423/625 |
| 5,114,437 | 5/1992 | Takeuchi et al. | 51/309 |
| 5,149,338 | 9/1992 | Fulton | 51/309 |

Primary Examiner—Mark L. Bell
Assistant Examiner—Willie J. Thompson
Attorney, Agent, or Firm—David Bennett

[57] ABSTRACT

A novel polishing slurry for particularly hard materials such a silicon carbide has been found. The slurry comprises diamond particles with a median particle size of around a micron and alpha alumina particles with a median size of from about 20 to about 200 nanometers.

10 Claims, No Drawings

POLISHING MATERIAL

BACKGROUND OF THE INVENTION

This invention relates to polishing materials particularly to polishing materials based on diamond that are used to produce fine finishes on hard materials.

Certain very hard ceramic materials are extremely difficult to polish to a fine finish unless a diamond polishing slurry is employed. Such materials include for example silicon carbide, aluminum/titanium carbide, tungsten carbide, aluminum nitride and alpha alumina monolith bodies. Diamond is very expensive and thus the polishing process itself is very costly.

Typical diamond slurries for this application contain diamond particles less than 2 microns in diameter and contain from about 10 to about 20 carats per liter of the diamond. The diamond particles need to be kept in suspension and this is typically done using suspending agents. U.S. Pat. No. 5,149,338 however teaches the use of a colloidal boehmite to maintain a diamond abrasive powder in suspension. This is said to yield a finish below 20 angstroms RMS when used on silicon carbide at a pH of 4. The boehmite has no significant abrasive qualities and is merely a means of presenting the diamond particles to the surface in a more efficient way. Moreover the pH used is severely corrosive of all but the best quality stainless steel, (or other resistant material), for the equipment contacted by the slurry. Other materials are available for polishing such hard ceramics including colloidal silica but while these are undoubtedly cheaper than diamond they are generally less effective and take much longer to achieve an acceptable finish.

There is therefore a need for a cheaper alternative to diamond for polishing hard materials that does not have a deleterious effect on the equipment used. This need is filled by the present invention which is more effective than diamond used alone and yet is quicker to achieve its desired surface finish. While not so cheap as colloidal silica it is substantially less expensive that a pure diamond polishing slurry.

DESCRIPTION OF THE INVENTION

The present invention provides an aqueous polishing slurry comprising diamond particles having a median particle size of less than 5 microns and alpha alumina particles with an average particle size of from 20 to 200 nanometers with a diamond to alumina weight ratio of from about 1:30 to about 1:90. Advantageously the slurry also comprises a suspending agent to maintain the dispersion of the diamond component.

The diamond component is a conventional polishing material as used in the prior art but need be used in much lower amounts than in conventional polishing slurries. These would typically comprise two to five grams of the diamond per liter of polishing slurry. The preferred slurries of the invention comprise less than 2 grams and conveniently from about 0.5 to about 1.5 gram of the same diamond per liter.

The alpha alumina component of the invention is a very finely divided material, and preferably one with a relatively narrow particle size distribution, for example one in which less than 5 volume percent of the particles have a size that is two or more times the volume average particle size of the alumina. Such materials can conveniently be obtained by the process described in U.S. Pat. No. 4,657,754. This process involves forming a sol of a hydrated alumina, adding a seed suitable for the promotion of nucleation of the conversion of transition alumina to alpha alumina. Suitable seed include alpha alumina itself and other materials isostructural with alpha alumina and with lattice parameters closely related to those of alpha alumina, such as alpha ferric oxide, chromium oxide (in the $Cr_2O_3$ form) and various oxides and mixed oxides of titania. The sol of hydrated alumina can be gelled before or after the seed particles are added. The gelation can be done by acid peptization or by reducing the water content. Thereafter the gel is dried and then fired to a temperature and for a period to convert most of the alumina to alpha alumina but insufficient to cause significant sintering of the alpha alumina particles to occur. This resulting product is relatively easily milled to a powder of the desired particle size and size distribution. Thus the preferred alumina powder is a seeded sol-gel alpha alumina.

DETAILED DESCRIPTION OF THE INVENTION

The preferred polishing compositions of the invention are in the form of slurries comprising from about 0.8 to about 1.5 grams per liter of diamond particles with a median particle size of from about 0.5 to about 2.5, and more preferably from about 0.8 to about 1.5 micron. These preferred slurries also comprise from about 40 to about 80 grams per liter of an alpha alumina having a median particle size of from about 20 to about 200, and more preferably from about 40 to 100 nanometers. These alpha alumina particles are preferably produced by a seeded sol-gel process and may contain a minor amount, such as up to about 25% but preferably less than about 10%, by weight, of a transitional alumina such as gamma alumina.

The polishing slurry also preferably contains a suspending agent in an amount that is effective to maintain the diamond particles in suspension. There are many known commonly available suspending agents which are capable of performing this function such as xanthan gum, magnesium aluminosilicate clays, certain acrylic polymers and carboxymethyl cellulose. The effective amount will of course vary with the agent used. Generally an effective amount for xanthan gum is about 1 to 5 grams per liter for the amounts of diamond that are preferably involved.

In addition the slurry can contain other additives with specific functions not related to the abrasive performance such as bactericides and in some cases buffers. Unlike some of the prior art slurries, the pH of the compositions of the present invention is preferably maintained above 7 and often about 10. This avoids the corrosive problems of working at acid pH values that characterize some of the prior art slurries.

One significant advantage of the slurries of the invention is that they can be recycled until the swarf build-up renders them ineffective. In normal use, this can take as long as two to three weeks.

The slurries of the invention can be used with any conventional type of lapping pad or pitch lap. However the best results are often obtained using a pad that is relatively hard such as a polyurethane pad filled with glass beads and sold by Rodel Corporation under the trade designation IC-60. The slurries of the invention can be used to polish in either a single side or a double sided mode.

The applied weight on the pad during polishing can be in the range that is conventionally used for such applications. However pressures at the higher end of the normal range can be used without detriment and this results in a faster cycle time without significant loss of surface quality.

DESCRIPTION OF PREFERRED EMBODIMENTS

The invention is now described with reference to the following examples which are for the purpose of illustration only and are not intended to imply any necessary limitation of the essential scope of the invention.

over an 80 micron traverse of a diamond stylus across the surface.

The units are angstroms. "TIR" is the greatest peak-to-valley distance, in angstroms, measured during the traverse that yielded the RMS result. Both RMS and TIR were measured using a "Tencor Alpha-Step 200" available from the Tencor Corporation.

The "Gum" added during the Experiments that exemplified the invention was xanthan gum and was used to keep the diamond in suspension.

Except for #1, where the pH was 4, the pH was maintained at 10.05

TABLE 1

| Descrip. | Exp. #1 | Exp. #2 | Exp. #3 | Exp. #4 | Exp. #5 | Exp. #6 | Exp. #7 | Exp. #8 |
| --- | --- | --- | --- | --- | --- | --- | --- | --- |
| Lapping Material | Pit. | Pit. | Pit. | IC 60 | IC 60 | IC 60 | IC 60 | IC 60 |
| Pol. Ag. | B + D | B + D | B + D | A + D | A + D | A + D | A + D | A |
| Al. Size | 200 Ang. | 50 nM | 50 nM | 50 nM | 50 nM | 1.0 Micr. | 50 nM | 50 nM |
| Al. Vol. | 4 oz | 4 oz | 4 oz | 250 ml/l | 250 ml/l | 250 ml/l | 250 ml/l | 250 ml/l |
| Al. % Solids | 17% | 17% | 17% | 22% | 22% | 22% | 22% | 22% |
| D. Size Microns | 2-4 | 2-4 | 2-4 | 1 | 1 | 1 | 1 | |
| D. Conc (ct/l) | 2.5 | 2.5 | 2.5 | 1.0 | 16 | 5 | 4 | |
| Weight (lbs) | 5 | 5 | 5 | 46.5 | 46.5 | 46.5 | 46.5 | 46.5 |
| Time hours. | 2 | — | 4 | 1.5 | .75 | 1.5 | .75-1.0 | 1.5 |
| Finish RMS/TIR | 10/90 | — | 0/35 | 5/80 | 5/40 | 40/550 | 5/35 | 150/1000 |
| Water Amnt. | 4 oz. | 4 oz. | 4 oz. | 750 ml + Gum | 750 ml + Gum | 750 ml + Gum | 750 ml + Gum | 750 ml + Gum |

EXAMPLE 1

The purpose of this Example is to demonstrate the improvement represented by the slurries of the present invention over the art as represented by the sole Example contained in U.S. Pat. No. 5,147,338 (discussed above).

Run #1 is a replication, in different equipment, of the Example in the above patent using all other conditions as specified therein. Run #2 was the same as Run #1 except that the alumina particle size was changed from 200 angstroms to 50 nanometers. Run #3 repeated Run #2 except that xanthan gum was added to keep the diamond in suspension. It will be noted from the results that in Run #2 the absence of the suspending boehmite that was present in Run #1 had disastrous results.

Runs #4, #5 #6 and #7 are according to the invention and show the effect of varying the amount of diamond and the particle size of the alumina. Comparison of Runs #5 and #7 show that there is little or no benefit from quadrupling the amount of diamond, and Run #6 shows that increasing the alumina particle size to an average particle size of one micron has a very negative effect on the performance. Run #8 duplicates Run #7 but without the diamond component. As can be seen the excellent properties of the compositions of the invention are not obtained using the alumina component alone.

In Table 1 below the following abbreviations are used: "A" is alpha alumina, "B" is boehmite and "D" is diamond. "Pit." is a commercial pitch available form Gugolz GmbH of Winterthur, Switzerland under the designation "CH84-04". This is similar to pitch used in U.S. Pat. No. 5,149,338 as the polishing tool. "Weight" is the applied load on the polishing tool. "Time" is the time taken to achieve the indicated finish. "RMS" is the calculated average amplitude of the peaks and valleys From the data in the above Table it is clear that the process of the prior art patent is not capable of yielding improved results merely by making the boehmite particles larger, indeed the results were so bad in Exp. #2 that no values could be obtained for the finish. Nor was the addition of gum the answer for although a good finish was obtained, it took four hours to obtain it.

The data in the Table also show that excellent results are obtained in a very short time using alpha alumina but that the results deteriorate drastically, (Expt #6), if the alpha particle size becomes comparable to that of the diamond component.

EXAMPLE 2

This Example shows the utility of the compositions of the Invention in the polishing of a number of very hard materials in comparison with diamond used alone.

In each case the diamond component had the same size, (about one micron) and was used in the same quantity, (5 ct/l). The alpha alumina used had a median particle size of 50 nanometers and was used in a concentration of 66 gram/liter. In each case the same amount of xanthan gum was used to maintain the dispersion of the components.

The results appear in Table 2 below.

TABLE 2

| Material | Polish | Time Hr. | RMS | TIR |
| --- | --- | --- | --- | --- |
| SiC (Hot Press) | D/A | 1.0 | 5 | 35 |
| SiC (Hot Press) | D | 1.0 | 15 | 70 |
| Al TiC | D/A | 1.0 | 7 | 60 |
| Al TiC | D | 1.5 | 10 | 70 |
| WC | D/A | .5-.75 | 5 | 50 |
| AlN | D/A | 1.5 | 140 | 700 |
| IBM Alumina | D/A | 2 | 165 | 1000 |

TABLE 2-continued

| Material | Polish | Time Hr. | RMS | TIR |
| --- | --- | --- | --- | --- |
| CPS Alumina | D/A | 1 | 225 | 1600 |

The abbreviations "D", "A", "RMS" and "TIR" are as explained for Table 1 and the RMS and TIR units are angstroms. The aluminum nitride, (AlN), contains a higher proportion of binder that leads to significant grain "pull-out" during polishing. This is also true of the IBM and CPS aluminas polished. Both are fully fired aluminas with about 10 to 15% of a binder.

These results clearly demonstrate that the diamond-/alumina compositions of the invention possess a striking synergistic effectiveness that is not matched by either component alone.

What is claimed is:

1. A polishing slurry comprising diamond particles having a particle size less than 5 microns, alpha alumina particles with an average particle size of from 20 to 200 nanometers and an amount of a suspending agent effective to maintain the diamond particles in suspension; the slurry having a diamond to alumina weight ratio of from about 1:30 to about 1:90.

2. A polishing slurry according to claim 1 in which the diamond particle have a median particle size of from about 0.5 to about 1.5 micron.

3. A polishing slurry according to claim 1 in which the alpha alumina particles have a median particle size of from about 40 to 5 about 100 nanometers.

4. A polishing slurry according to claim 1 in which the diamond to alumina weight ratio is from about 1:50 to about 1:80.

5. A polishing slurry according to claim 1 in which the solids content is from about 40 to about 80 grams per liter.

6. A polishing slurry according to claim 1 in which the suspending agent is xanthan gum.

7. A polishing slurry according to claim 6 in which the amount of the xanthan gum is from about 1 to about 5 gm/l.

8. A polishing slurry comprising from about 1 to 10 carat/liter of diamond particles having a median particle size of from about 0.2 to about 1.0 micron, from about 30 to about 90 grams/liter of alpha alumina particles with an median particle size of from about 40 to about 100 nanometers and an amount of a suspending agent effective to maintain the diamond particles in suspension; the slurry having a diamond to alumina weight ratio of from about 1:40 to about 1:80.

9. A polishing slurry according to claim 8 in which the suspending agent is xanthan gum.

10. A polishing slurry according to claim 9 which comprises from about 1 to about 5 gm/liter of xanthan gum as the suspending agent.

* * * * *